(12) United States Patent
Garipally et al.

(10) Patent No.: US 11,057,271 B2
(45) Date of Patent: Jul. 6, 2021

(54) SYSTEMS AND METHOD UPDATING ADC CONFIGURATION WITH INTENDED STATE USING DESIRED STATE API

(71) Applicant: Citrix Systems, Inc., Fort Lauderdale, FL (US)

(72) Inventors: Swetha Garipally, Bengaluru (IN); Pradeep Gangishetty, Bengaluru (IN); Chandra Keerthi Reddy, Bengaluru (IN); Subrata Sarkar, Bengaluru (IN); Vemula Srimithra, Bengaluru (IN); Vinay Shivananda, Bengaluru (IN); Raghav S N, Bengaluru (IN); Aman Chaudhary, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/447,130

(22) Filed: Jun. 20, 2019

(65) Prior Publication Data
US 2020/0403853 A1    Dec. 24, 2020

(51) Int. Cl.
G06F 15/16    (2006.01)
H04L 12/24    (2006.01)
H04L 29/08    (2006.01)

(52) U.S. Cl.
CPC ............ H04L 41/082 (2013.01); H04L 67/34 (2013.01)

(58) Field of Classification Search
CPC . H04L 67/082; H04L 41/0806; H04L 41/082; H04L 67/34
USPC ........................................................ 709/221
See application file for complete search history.

(56) References Cited

U.S. PATENT DOCUMENTS

| 2018/0027080 A1 | 1/2018 | Yang et al. | |
| 2018/0113790 A1* | 4/2018 | Chunduri | H04L 67/16 |
| 2018/0152534 A1 | 5/2018 | Kristiansson et al. | |
| 2019/0140903 A1* | 5/2019 | Ahuja | H04L 67/1002 |
| 2019/0238636 A1* | 8/2019 | Li | H04L 67/1095 |
| 2019/0317824 A1* | 10/2019 | Mani | G06F 9/48 |
| 2020/0028760 A1* | 1/2020 | Degioanni | H04L 41/5058 |

(Continued)

OTHER PUBLICATIONS

G. Fu, J. Sun and J. Zhao, "An optimized control access mechanism based on micro-service architecture," 2018 2nd IEEE Conference on Energy Internet and Energy System Integration (EI2), Beijing, China, 2018, pp. 1-5 (Year: 2018).*

(Continued)

*Primary Examiner* — Oscar A Louie
*Assistant Examiner* — Messeret F Gebre
(74) *Attorney, Agent, or Firm* — Foley & Lardner LLP

(57) ABSTRACT

Described herein are systems and methods for updating configuration of a device based on changes to microservices. A device may receive a request via a desired state application programming interface (API) to update a configuration of the device to manage a desired set of instances of microservices. The device may identify from the request, a first set of endpoint information for each instance of a microservice in the desired set of instances of microservices. The first set of endpoint information may include an internet protocol (IP) address and port of an endpoint of a respective instance of the microservice. The first set or second set of endpoint information may include a weight for each instance of the microservice.

20 Claims, 12 Drawing Sheets

(56) References Cited

U.S. PATENT DOCUMENTS

2020/0133689 A1* 4/2020 Ferrell ............... G06F 9/45558

OTHER PUBLICATIONS

Rudrabhatla, C. K. (2018). Comparison of event choreography and orchestration techniques in microservice architecture. International Journal of Advanced Computer Science and Applications, 9(8), 18-22 (Year: 2018).*
J. Almalki and H. Shen, "Developing Cross-Organisational Service-Based Software Systems through Decentralised Interface-Oriented Continuous Integration," 2018 25th Australasian Software Engineering Conference (ASWEC), Adelaide, SA, 2018, pp. 191-200 (Year: 2018).*
M. Alam, J. Rufino, J. Ferreira, S. H. Ahmed, N. Shah and Y. Chen, "Orchestration of Microservices for IoT Using Docker and Edge Computing," in IEEE Communications Magazine, vol. 56, No. 9, pp. 118-123, Sep. 2018 (Year: 2018).*
Anoymous: "Server-side service discovery pattern", Jun. 10, 2019 (Jun. 10, 2019), XP055733406, Retrieved from the Internet: URL: https://web.archive.org/web/20190610210657/https://microservices.io/patterns/server-side-discovery.html [retrieved on Sep. 23, 2020].
International Search Report and Written Opinion on International Appl. No. PCT/US2020/038323, dated Oct. 12, 2020.

* cited by examiner (a)

(b)

REQUEST

Http Method: PUT

Headers:
  Content-Type: application/json

URL:
http://<nsip>/nitro/v1/config/servicegroup_servicegroupmember_binding/foo

Payload:
{
"servicegroupmember_servicegroupmemberlist_binding":
{
"servicegroupname":"foo",
"members":
[
{"ip":"1.1.1.1","port":80,"weight":1},
{"ip":"1.1.1.2","port":80,"weight":1},
{"ip":"1.1.1.3","port":80,"weight":1}
]
}
}

(a)

RESPONSE

Success Case
Headers:
  HTTP/1.1 201 Created
Payload:
  NULL

Failure Case
Headers:
  HTTP/1.1 207 Multi Status
Payload:
{
"errorcode":XXX,
"message":"Failed to bind some member bindings",
"severity":"ERROR",
"servicegroupmember_servicegroupmemberlist_binding":
{
"servicegroupname":"foo",
"failedmembers":
[
{"ip":"1.1.1.2","port":80,"weight":1},
{"ip":"1.1.1.3","port":80,"weight":1}
]
}
}

SYSTEMS AND METHOD UPDATING ADC CONFIGURATION WITH INTENDED STATE USING DESIRED STATE API

FIELD OF THE DISCLOSURE

The present application generally relates to updating a configuration of an application delivery controller to a desired state using an application programming interface (API).

BACKGROUND

Enterprises may moving applications from monolithic architecture to microservice architecture. Microservices may be dynamic, where the number of instances of each microservice and their locations in a cluster change at a rapid pace. Tools may be used for deploying, scaling, and managing microservice-based applications.

SUMMARY

This Summary is provided to introduce a selection of concepts in a simplified form that are further described below in the Detailed Description. This Summary is not intended to identify key features or essential features, nor is it intended to limit the scope of the claims included herewith.

For microservices to communicate with each other, a client microservice may discover the location of the target microservices it wishes to communicate with. This service discovery process may be often facilitated by an intermediary device (e.g., an application delivery controller (ADC) or an edge-proxy). In a microservices environment (e.g., Kubernetes), communication from outside or within the cluster maybe enabled by a controller (sometimes referred herein as an ingress or East-West controller). The controller may interface with an API server to learn about all ingress or service configurations and changes, and then reacts by configuring an application delivery controller (ADC), a load-balancer, or an edge proxy for performing load balancing, security, rate-limiting, tracing or other functions to be performed in the path of communications between the microservices.

One challenge may include keeping the ADC configuration up to date with the rate of change occurring on the microservices deployments for accurately serving the application traffic. One configuration synchronization approach may put a heavy burden on the controller.

The present disclosure is directed to systems and methods for using a desired state API to seamlessly update application delivery controller (ADC) configuration in any orchestration system. To solve this problem, an optimized API called "desired state API" may be implemented on an ADC. This may allow a controller of the orchestration system to instantaneously update the ADC configuration with the desired state matching the rate at which the microservices are going through changes. This API may also allow the controller to be stateless and simple in design.

Described herein is a method for updating configuration of a device based on changes to microservices. The method may include receiving, by a device intermediary to a plurality of clients and microservices, a request via a desired state application programming interface (API) to update a configuration of the device to manage a desired set of instances of microservices. The method may include identifying, by the device from the request, a first set of endpoint information for each instance of a microservice in the desired set of instances of microservices. The first set of endpoint information may include an internet protocol (IP) address and port of an endpoint of a respective instance of the microservice. The first set or second set of endpoint information may further include a weight for each instance of the microservice.

The method may include communicating, by the device, the first set of endpoint information to each of one or more packet engines of the device. The packet engines may be configured to manage network traffic to a current set of instances of microservices. The method may include determining, by the one or more packet engines, a change between the first set of endpoint information and a second set of endpoint information configured on the one or more packet engine for each instance of the microservice in the current set of instance of microservices. The method may include updating, by the one or more packet engines based at least on the change, the configuration of the one or more packet engines to manage the desired set of instances of microservices.

The method may include receiving, by the device, the request from a controller of a cluster of microservices. The controller may be configured to receive information for the request from an API server for the microservices.

The method may further include determining, by the one or more packet engines, one or more endpoints in the first set of endpoints that are not in the second set of endpoints. The method may further include adding, by the one or more packet engines, configuration on the one or more packet engines for the one or more endpoints.

The method may include determining, by the one or more packet engines, one or more endpoints in the second set of endpoints that have been removed from the first set of endpoints. The method may further include removing, by the one or more packet engines, configuration on the one or more packet engines corresponding to the one or more endpoints.

The method may include determining, by the one or more packet engines, one or more endpoints that are in both the first set of endpoints and the second set of endpoints. The method may further include maintaining, by the one or more packet engines, configuration on the one or more packet engines corresponding to the one or more endpoints.

Described herein is a system for updating configuration of a device based on changes to microservices. The system may include a device comprising one or more processors, coupled to memory and intermediary to a plurality of clients and microservices. The device may be configured to receive a request via a desired state application programming interface (API) to update a configuration of the device to manage a desired set of instances of microservices. The device may be configured to identify from the request, a first set of endpoint information for each instance of a microservice in the desired set of instances of microservices. The first set of endpoint information may include an internet protocol (IP) address and port of an endpoint of a respective instance of the microservice. The first set or second set of endpoint information may include a weight for each instance of the microservice.

The device may be configured to communicate the first set of endpoint information to one or more packet engines of the device configured to manage network traffic to a current set of instances of microservices. The one or more packet engines may be configured to determine a change between the first set of endpoint information and a second set of endpoint information configured on the one or more packet engine for each instance of the microservice in the current set of instances of microservices. The packet engines may be configured to update, based at least on the change, the configuration of the one or more packet engines to manage the desired set of instances of microservices.

The device may be configured to receive the request from a controller of a cluster of microservices. The controller may be configured to receive information for the request from an API server for the microservices.

One or more packet engines of the system may be configured to determine one or more endpoints in the first set of endpoints are not in the second set of endpoints. The one or more packet engines may be further configured to add configuration on the one or more packet engines for the one or more endpoints.

One or more packet engines of the system may be configured to determine one or more endpoints in the second set of endpoints that have been removed from the first set of endpoints. The one or more packet engines may be further configured to remove configuration on the one or more packet engines corresponding to the one or more endpoints.

One or more packet engines of the system may be configured to determine one or more endpoints that are in both the first set of endpoints and the second set of endpoints. The one or more packet engines may be further configured to maintain configuration on the one or more packet engines corresponding to the one or more endpoints.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 4B is a block diagram of example messages for updating configurations of a device based on changes to microservices;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of a service graph based platform and technology; and Section F describes embodiments of systems and methods for ADC configuration with intended state using desired state API.

A. Network and Computing Environment

Figure 1A:
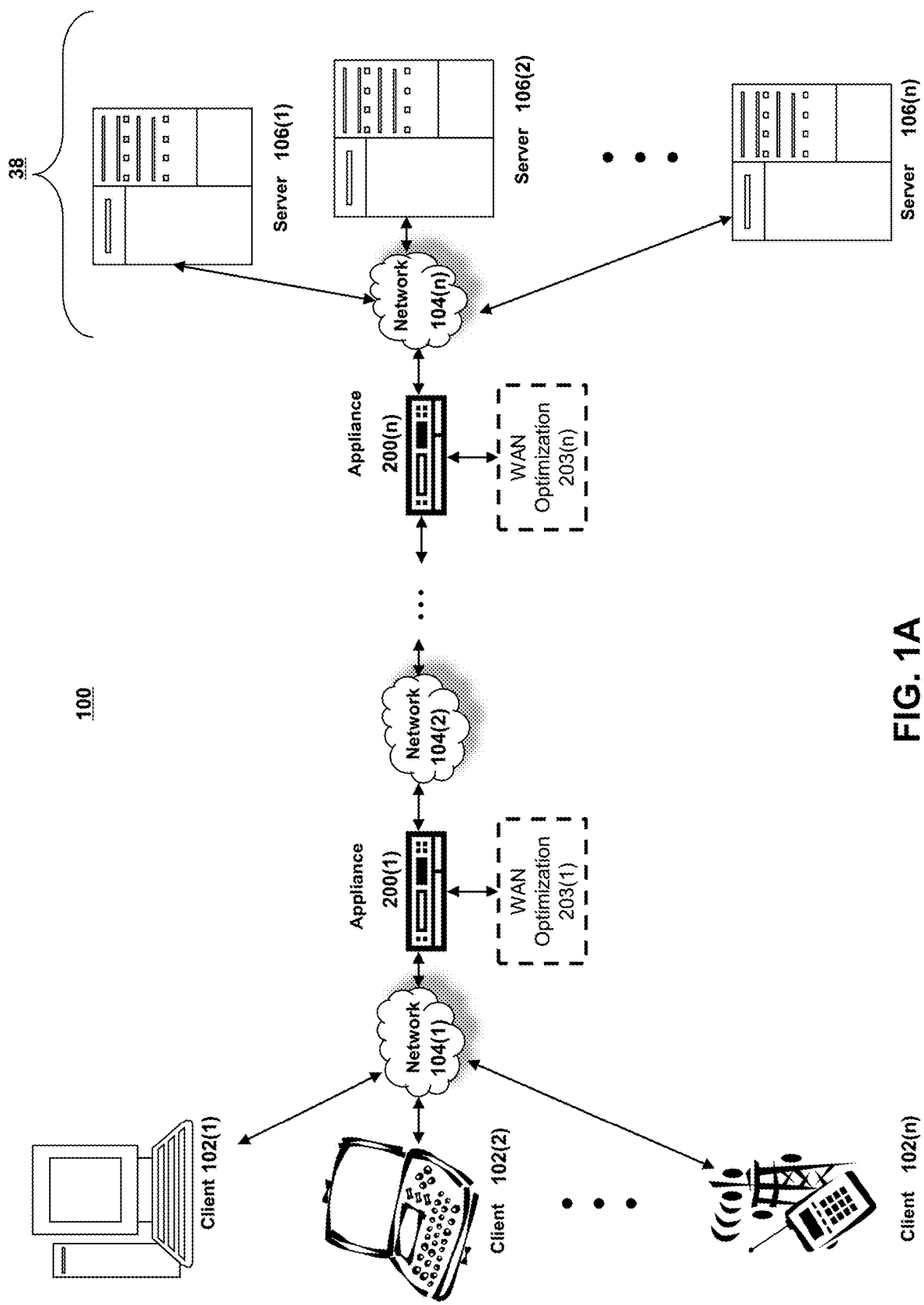
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
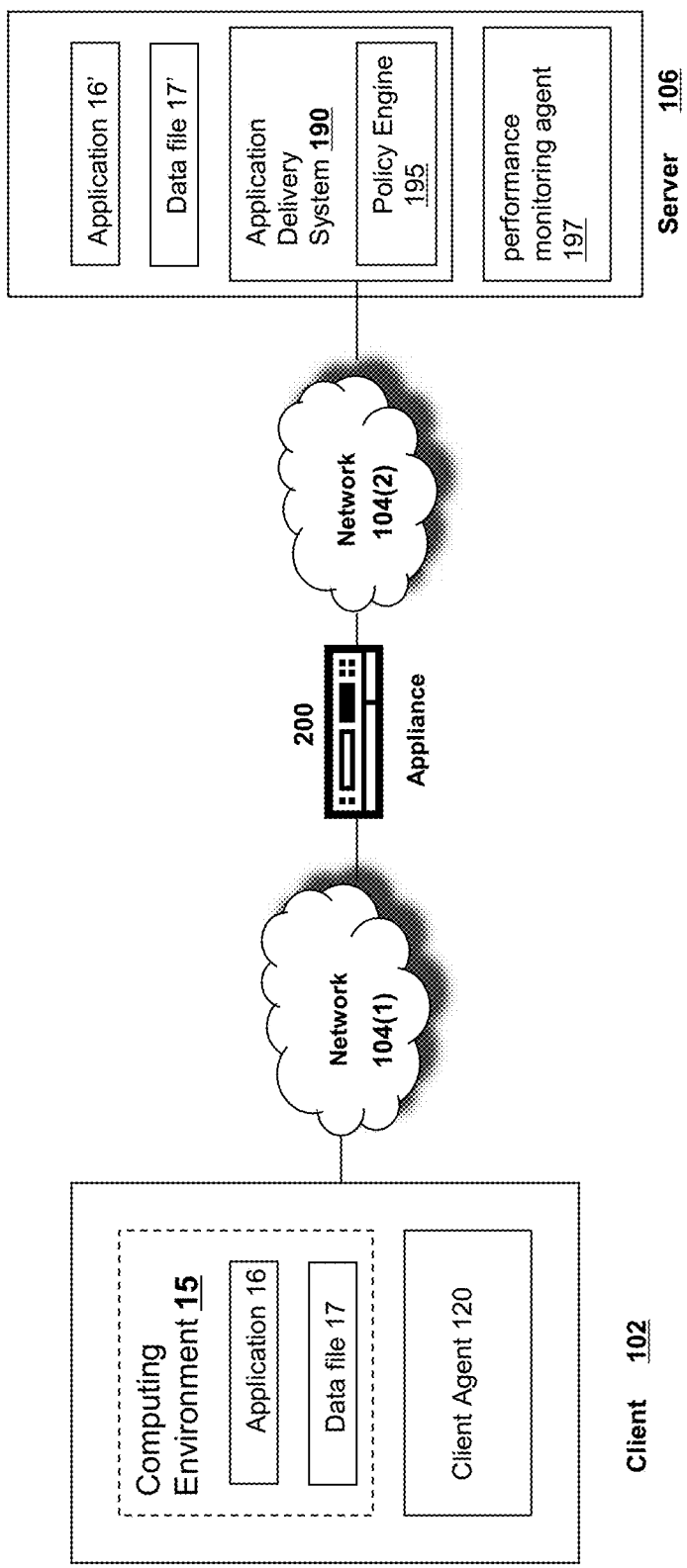
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include a client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
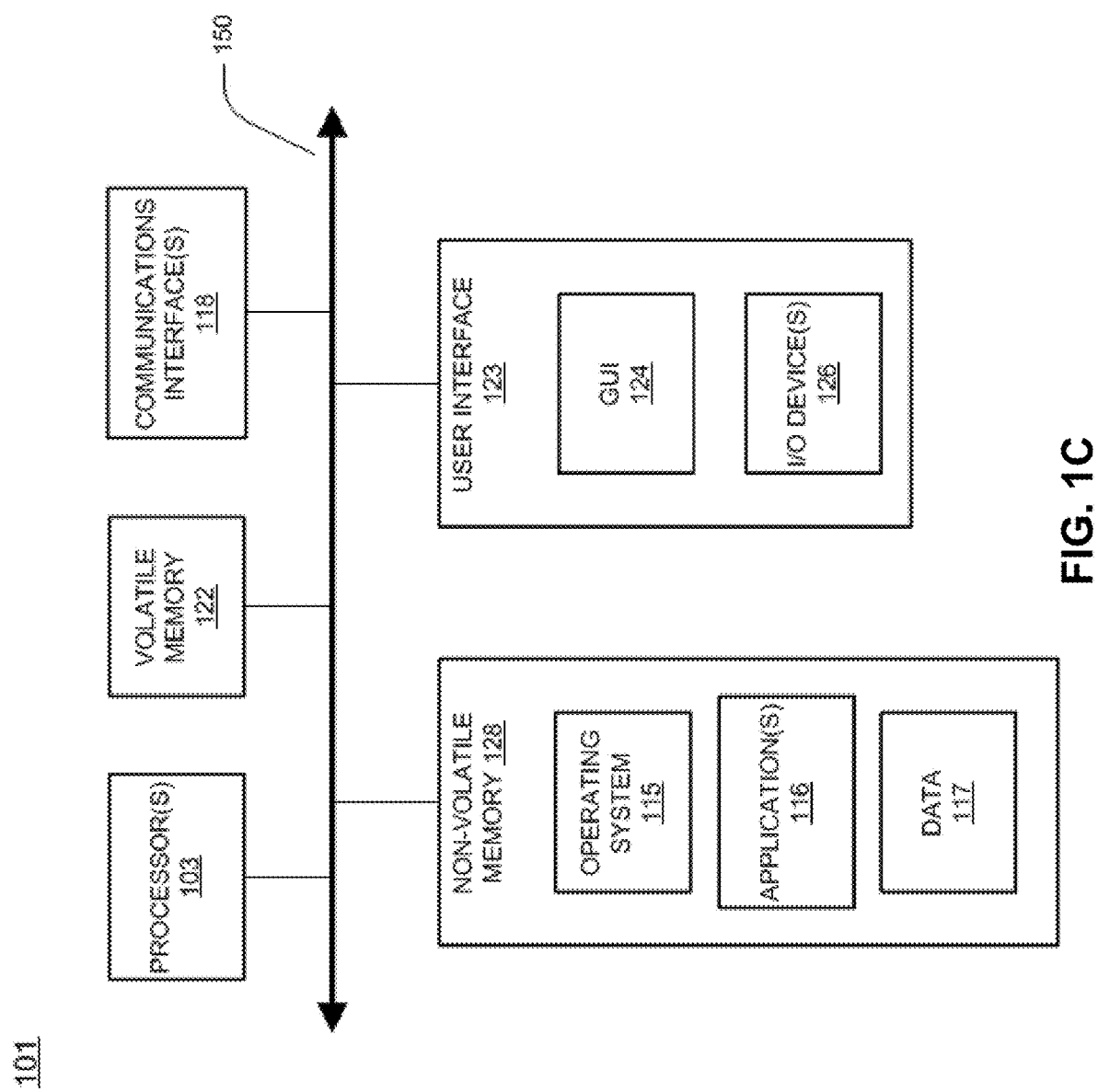
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
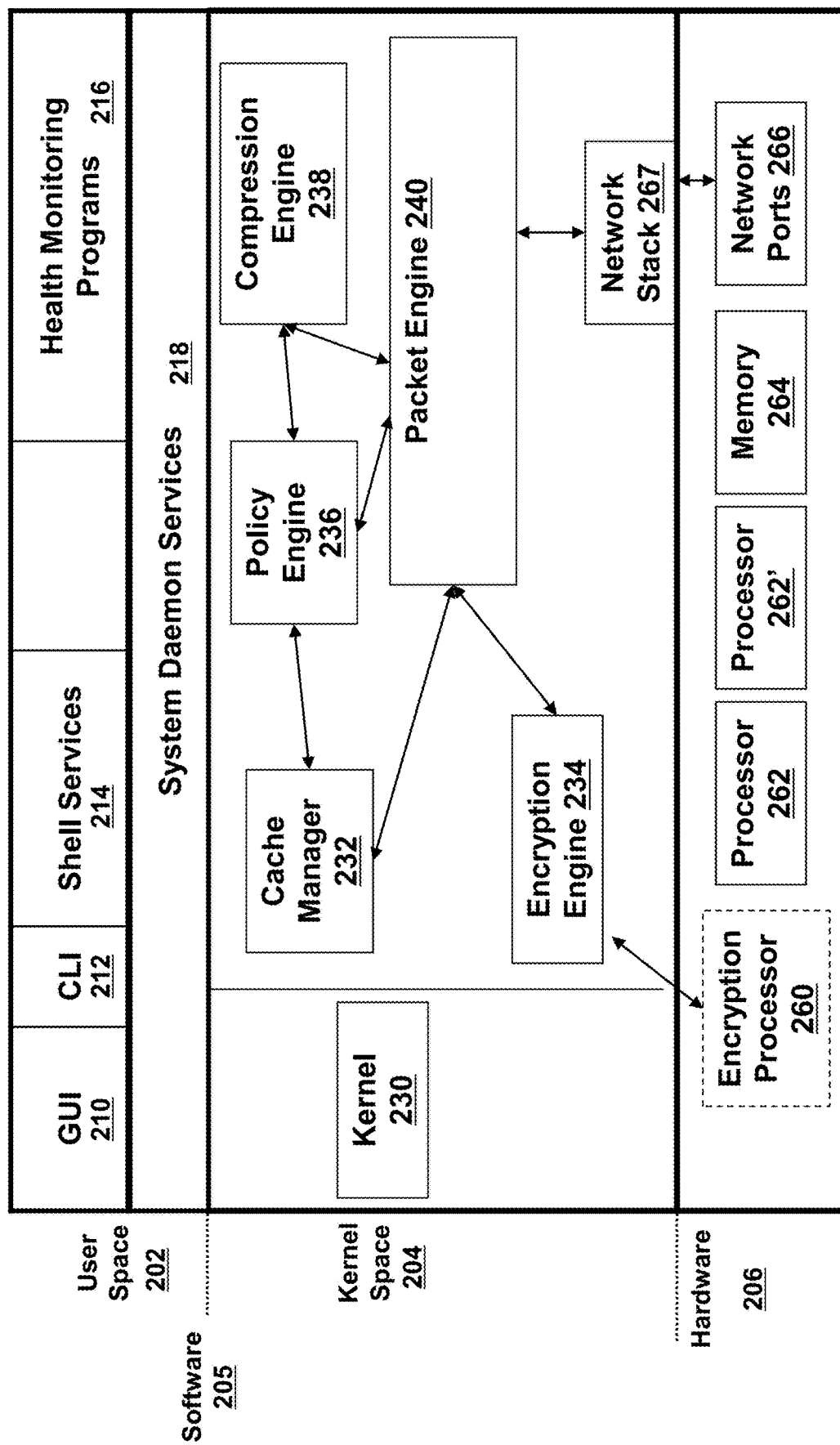
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
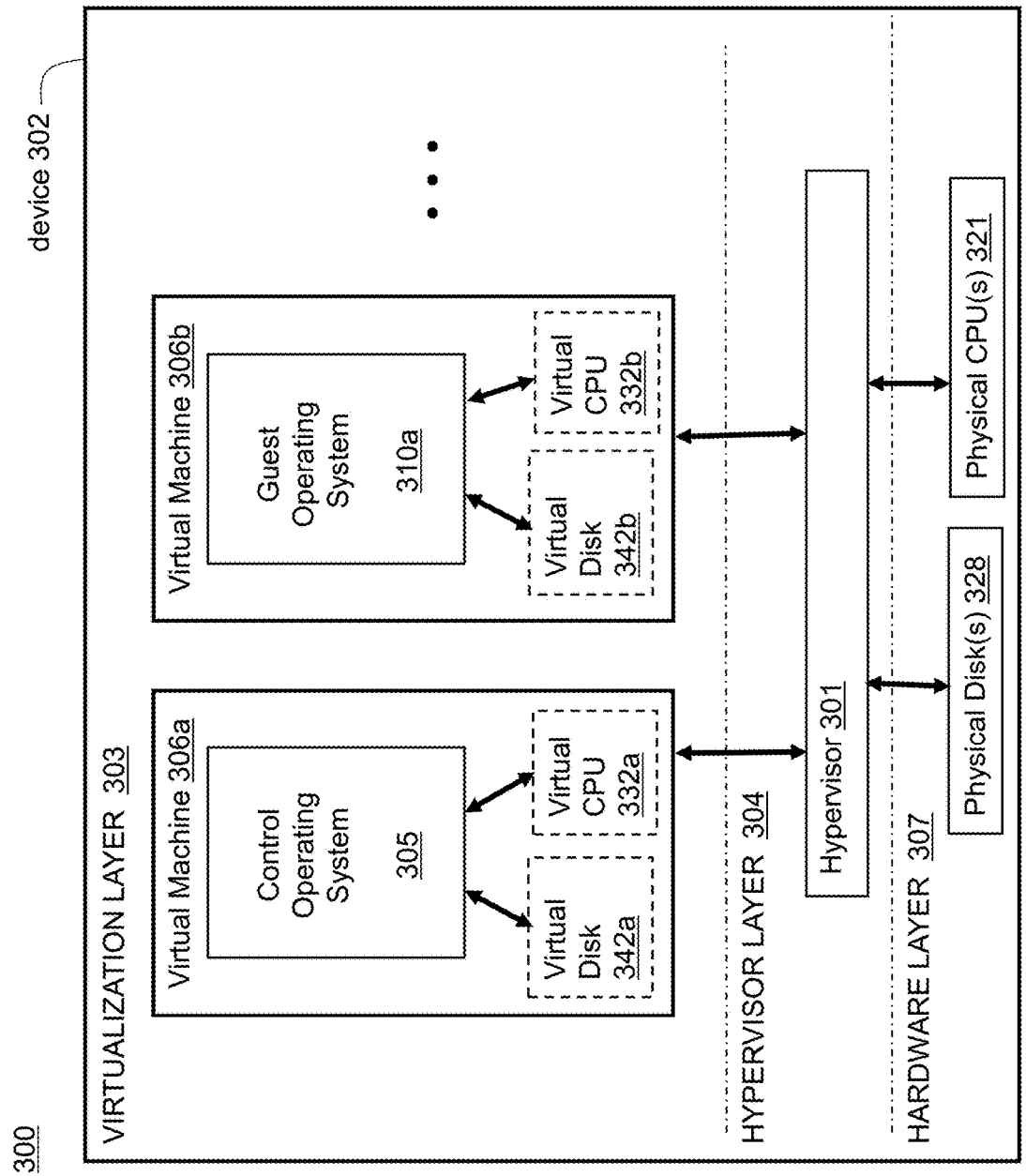
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. A plurality of appliances 200 or other computing devices (e.g., nodes) may be joined into a single cluster. Cluster may operate as an application server, network storage server, backup service, or any other type of computing device to perform many of the functions of appliances 200 and/or 205.

Figure 4A:
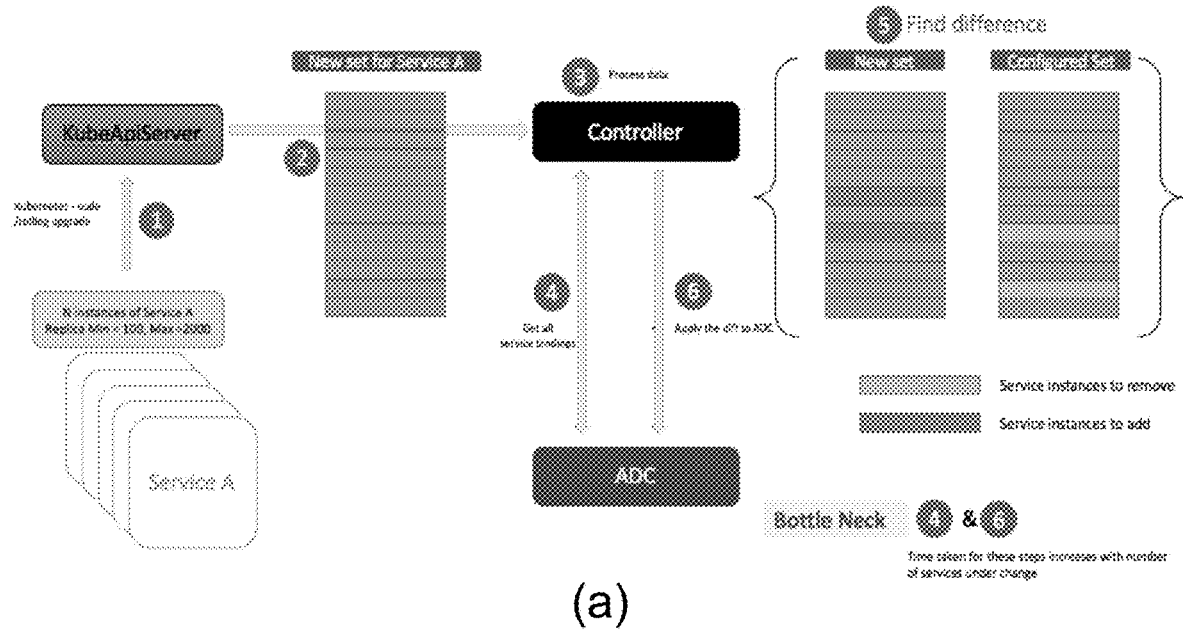
FIG. 4A is a sequence diagram of example processes for updating configurations of a device based on changes to microservices.
Figure 4A:
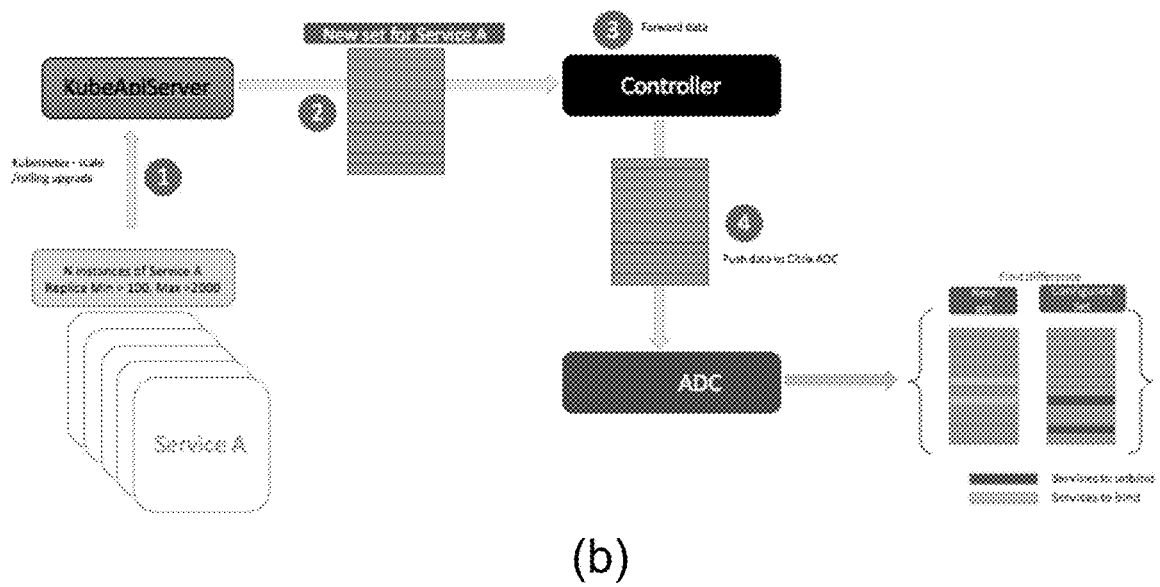

D. Systems and Methods for Updating a Service Configuration of an Application Delivery Controller Referring now to FIG. 4A, depicted are sequence diagrams of processes for updating configurations of a device based on changes to microservices. FIG. 4A(a) shows a process for a service configuration changes using the "Read-Delta-Apply" approach compared with the workflow for a service configuration change on with the desired state API In the "Read-Delta-Apply" approach, the controller first may learn the service state change from the API-server by watching an "endpoints" API. The controller next may read or retrieve the current state from the application delivery controller (ADC). Next, the controller compares the retrieved state with the state learned from the API-server. If there is a difference between the retrieved and learned states, the controller modifies the state in the application delivery controller to synchronize the service state. This approach of configuration synchronization is resource intensive at the controller and is not scalable as the number of microservices and the endpoints (instances) for each microservice increases. The controller has to fetch the service state from the ADC every time it has to synchronize the service state, creating a bottle neck.

FIG. 4A(b) shows the desired state API approach. Under this approach, the ADC internally updates the service state removing the need for the controller to fetch the service state from the ADC. The desired state API on the ADC allows the controller to send the service state directly to the ADC which internally updates the service state with the desired state provided by the controller. This eliminates the "read" and "delta" steps required in the "Read-Delta-Apply" approach. This allows the controller to be designed more simply and allows for more rapid configuration changes of microservices.

Referring now to FIG. 4B, depicted is a request and response using the desired state API, which conforms to the REST architectural style. The request transmits the request from the controller to update the service state in the ADC including the new endpoints. The response from the ADC confirms to the controller that the service state has been updated or returns an error message to alert the controller that the state has not been updated.

Figure 4C:
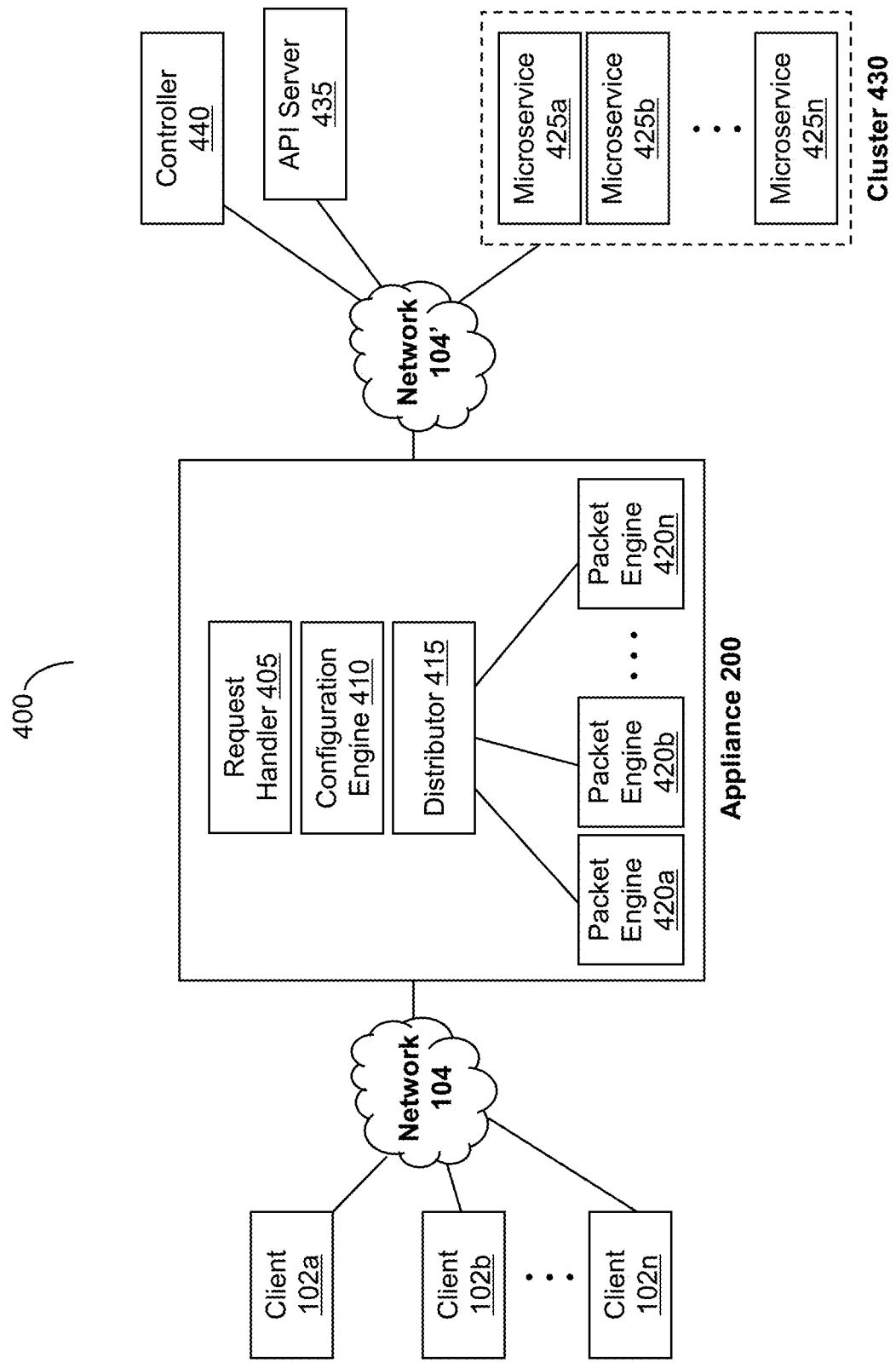
FIG. 4C is a block diagram of an example system for updating configurations of a device based on changes to microservices.

Referring now to FIG. 4C, depicted is a block diagram of a system 400 for updating configuration of a device based on changes to microservices. In brief overview, the system 400 may include at least one client 102a-n (hereinafter generally referred to as client 102), at least one appliance 200 (sometimes herein referred as an application delivery controller), at least one cluster 430 of microservices 425a-n (hereinafter generally referred to as microservices 425), at least one application programming interface (API) server 435, and at least one controller 440, among others. The appliance 200 may be intermediary to the client 102 and to the cluster 430 of microservices 425. The appliance 200 may include at least one request handler 405, at least one configuration engine 410, at least one distributor 415, and a set of packet engines 420a-n (hereinafter generally referred to as packet engines 420). The client 102 and the appliance 200 may be communicatively coupled to each other via at least one network 104. The appliance 200, the cluster 430 of microservices 425, the API server 435, and the controller 440 may be communicatively coupled to one another via at least one network 104'.

In further detail, the controller 440 of the cluster 430 of microservices 425 may manage each microservice 425 in the cluster 430. In managing the microservices 425 of the cluster 430, the controller 440 may communicate with the API server 435 for the microservices 425. In some embodiments, the API server 435 may be a part of the controller 440. The API server 435 may facilitate management of the cluster 430 of microservices 425. For example, the API server 435 may manage the microservices 425 of the cluster 430 in accordance with the Kubernetes orchestration system. The API server 435 may perform an update to the instances of the microservices 425 in the cluster 430. In conjunction with the update, the controller 440 may receive, retrieve, or otherwise identify a new set of endpoint information on each microservice 425 in the cluster 430. In some embodiments, the controller 440 may monitor for updates to the microservices 425 in the cluster 430. In response to detecting the update, the controller 440 may identify the set of endpoint information. In some embodiments, the new set of endpoint information may be received by the controller 440 from the API server 435. The new set of endpoint information for each microservice 425 may include an Internet Protocol (IP) address and a port of an endpoint of an instance of the microservice 425 in the cluster 430. In some embodiments, the endpoint information may include a weight for the instance of the microservice 425 in the cluster 430. The weight for the instance of the microservice 425 may correspond to a level of priority of the microservice 425 within the cluster 430.

Using the endpoint information, the controller 440 may generate a request via a desired state application programming interface (API) to update a configuration of the appliance 200 to manage a desired set of instances of microservices 425. In some embodiments, the controller 440 may generate the request as an HTTP message to send to the appliance 200 via the network 104'. The HTTP message may be a HTTP PUT command having the desired state API in a payload of the HTTP message (e.g., as depicted in FIG. 4B(a)). In some embodiments, the payload of the HTTP message may be in accordance with JavaScript Object Notation (JSON). In generating the request, the controller 440 may determine the desired state API based on the set of endpoint information. The desired state API may correspond to the new set of endpoint information identified in conjunction with the update to the microservices 425 in the cluster 430. In some embodiments, the desired state API may conform to representational state transfer (REST) protocol or the Citrix NITRO® protocol. In some embodiments, the controller 440 may identify a desired set of instances of microservices 425 affected by the update by the API server 435. The desired set of instances may be a subset of microservices 425 in the cluster 430. The desired state API may correspond to affect the desired instances of microservices 425 in conjunction with the update. Because the endpoint information for the microservices 425 has changed, the appliance 200 may be reconfigured for the clients 102 to properly access the microservices 425. With the generation of the request, the controller 440 of the cluster 430 of microservices 425 may send the request to the appliance 200 via the network 104'.

The request handler 405 executing on the appliance 200 may receive the request via the desired state API to update the configuration of the appliance 200 to manage the desired set of instances of the microservices 425. In some embodiments, the request handler 405 may receive the request from the controller 440 of the cluster 430 of microservices 425. Upon receipt, the request handler 405 may validate the request to update the configuration of the appliance 200. To validate, the request handler 405 may determine whether the request is from a proper source for the request for updating the configuration of the appliance 200. The proper source for the request may correspond to a network entity (e.g., the controller 440 or a system administrator of the appliance 200) permitted to update the configuration of the appliance 200. For example, the proper source may be specified via a network address. Based on the comparison of the source of the request and the proper source, the request handler 405 may perform the validation of the request. When the request is determined to be not validated, the request handler 405 may perform no additional processing with respect to the received request. In some embodiments, the request handler 405 may send an indication that the request is not validated to the controller 440 of the microservices 425 in the cluster 430.

When the request is determined to be validated, the request handler 405 may parse the request to identify the new set of endpoint information for each instance of the microservice 425 in the desired set of instances of microservices 425. In some embodiments, the request handler 405 may parse the HTTP message corresponding to the request to identify the new set of endpoint information from the payload of the HTTP message. The new set of endpoint information parsed from the request may correspond to the update to the instances of microservices 425 in the cluster 430 carried out by the API server 435. The information for each endpoint in the new set may include the IP address and the port of a corresponding instance of the microservice 425 in the cluster 430. In some embodiments, the endpoint information may include the weight for the instance of the microservice 425 in the cluster 430. In some embodiments, the request handler 405 may also translate the request from JSON to a dynamic length binary structure. To translate, the request handler 405 may identify the new set of endpoint information in JSON form. Using the JSON corresponding to the new set of endpoint information, the request handler 405 may convert to binary data to generate the dynamic length binary structure. The binary data may be included into the dynamic length binary structure.

The configuration engine 410 executing on the appliance 200 may authenticate the request based on the dynamic length binary structure generated from the payload of the request. In some embodiments, the configuration engine 401 may analyze and evaluate the received request using risk-based authentication (RBA) technique. The configuration engine 410 may determine a risk score based on the new set of endpoint information indicated in the binary structure generated from the payload of the request. The risk score may indicate a level of likelihood that the desired state API as indicated in the new set of endpoint information adversely affects the performance of the appliance 200 in accessing the microservices 425 of the cluster 430.

In determining the risk score, the configuration engine 410 may determine whether the IP address or port in the new set of endpoint information is valid. For example, the new set of endpoint information may include invalid IP addresses or ports that does not correspond to any of the microservices 425. In such scenarios, the configuration engine 410 may generate a relatively high risk score. On the other hand, the new set of end point information may include valid IP addresses or ports. In this case, the configuration engine 410 may calculate a relatively lower risk score. Based on the determination, the configuration engine 410 may calculate, generate, or determine the risk score for the new set of endpoint information.

Once determined, the configuration engine 410 may compare the risk score to a threshold score. The threshold score may correspond to the score at which to authenticate. If the risk score is determined to not satisfy the threshold score (e.g., less than), the configuration engine 410 may determine the authentication of the request as unsuccessful. The configuration engine 410 may also terminate any further processing of the request by the appliance 200. In some embodiments, the configuration engine 410 may send an indication that the request is not authenticated to the controller 440 of the microservices 425 in the cluster 430.

Conversely, if the risk score is determined to satisfy the threshold score (e.g., greater than or equal to), the configuration engine 410 may determine the authentication of the request as successful. The configuration engine 410 may also continue processing the binary structure generated from the payload of the request. Furthermore, the configuration engine 410 may request, retrieve, or access a state model for the endpoint information of the instances of microservices 425 in the cluster 430. The state model may be a data structure for maintaining the sets of endpoint information across each update. The state model may be, for example, a state machine (e.g., a finite state automaton). The state model may include sets of endpoint information across time for each instance of microservices 425 in the cluster 430 managed by the controller 440. The state model may be maintained on a database of the appliance 200.

The distributor 415 executing on the appliance 200 may relay, provide, or otherwise communicate the new set of endpoint information to each packet engine 420 on the appliance 200. In some embodiments, the communication of the new set of endpoint information identified from the request may be performed in response to successful validation and authentication of the request. Each packet engine 420 of the appliance 200 may manage network traffic to a current set of instances of the microservices 425. The current set may correspond to instances of the microservices 425 that remain or become operational subsequent to the update to the microservices 425 in the cluster 430. The network traffic may include packets exchanged between the client 102 accessing resources on one or more of the microservices 425 of the cluster 430 and each microservice 425 providing data to the client 102.

Each packet engine 420 executing on the appliance 200 may receive the new set of endpoint information from the distributor 415. The packet engine 420 may retrieve or identify a current set of endpoint information for the instances of the microservices 425 in the cluster 430. The current set of endpoint information may correspond with a current configuration of the appliance 200. The current set of endpoint information may include an IP address and a port of an endpoint of a corresponding instance of the microservice 425 in the cluster 430 prior to the update to the cluster 430 of microservices 425 by the API server 435. The current set of endpoint information may differ from the new set of endpoint information received from the distributor 415. In some embodiments, the packet engine 420 may identify the current set of endpoint information from sets of endpoint information maintained on the state model accessed by the configuration engine 410.

With the identifications, the packet engine 420 may compare the set of endpoint information received from the distributor 415 with the current set of endpoint information for the instances of the microservices 425 in the cluster 430. The comparison may be for each instance of microservice 425 in the cluster 430. In some embodiments, the packet engine 420 may compare the IP address, port, and weight in the new set of endpoint information from the distributor 415 with the IP address, port, and weight from the current set of endpoint information. In some embodiments, the packet engine 420 may identify the sets of endpoint information from the new set and the current set for each instance of microservice 425 in the cluster 430. For the same instance, the packet engine 420 may compare the IP address and the port from the new set with the IP address and the port from the current set. In some embodiments, the packet engine 420 may also compare the weight from the new set with the weight from the current set for the same instance of the microservice 425.

From the comparison, the packet engine 420 may determine a change between the new set of endpoint information received from the distributor 415 and the current set of endpoint information for the instances of microservices 425 in the cluster 430. In some embodiments, the packet engine 420 may determine the change for the instances of microservices 425 identified as part of the desired set of instances in the received request. The change may indicate whether the new set of endpoint information differs from the current set of endpoint information for the same instance of microservices 425. In some embodiments, the change determined by the packet engine 420 may also indicate whether the IP address, the port, or the weight has changed between the new set and the current set of endpoint information.

Based on the change determined between the new set and the current set, the packet engine 420 may update the configuration of the packet engine 420 itself to manage the desired set of microservices 425 in the cluster 430 as identified in the received request. In some embodiments, the packet engine 420 may reconfigure the packet engine 420 itself in accordance with the determined change. The configuration of the packet engine 420 may be used to route the network traffic to the instance of the microservice 425 corresponding to the endpoint as referenced by the IP address and the port. The update to the configuration may cause the packet engine 420 to change the routing of the network traffic to the instances of microservices 425 in the cluster 430 in accordance with the new set of endpoint information identified from the request. The update in the configuration of the packet engines 420 may be performed without any synchronization, thereby allowing for a seamless transition between updates to the cluster 430 of microservices 425.

From the determine change, the packet engine 420 may identify or determine one or more endpoints in both the new set and the current set of endpoint information. The endpoints that are in both sets may correspond to instances of microservices 425 that are to continue running and receive network traffic after the application of the update to the microservices 425. In updating the configuration, the packet engine 420 may maintain the configuration on the packet engine 420 corresponding to the endpoints for microservices 425 that in both sets. By maintaining, the packet engine 402 may continue to use the same configuration as prior to the application of the update by the API server 435 to the cluster 430 of microservices 425. In this manner, the packet engine 420 may continue routing the network traffic to the microservice 425 corresponding to the endpoint in both the new set and the current set of endpoint information. The maintained configuration may correspond to an endpoint in the desired set of instances of microservices 425 as identified in the received request.

Additionally, the packet engine 420 may identify or determine one or more endpoints in the new set of endpoint information that are not in the current set of endpoint information. The endpoints in the new set that are non-existent in the current set may correspond to new instances of microservices 425 that are added to the cluster 430 in the application of the update by the API server 435. In updating the configuration, the packet engine 420 may add a configuration to the packet engine 420 itself for each new endpoint in the new set of endpoint information. The added configuration may specify that the packet engine 420 is to route the network traffic to the new instance of the microservice 425 corresponding to the new endpoint identified from the comparison between the new set and the current set of endpoint information. In some embodiments, the packet engine 420 may generate the new configuration to specify that the packet engine 420 is to route the network traffic to the new instance of the microservice 425. The new configuration may include or correspond to the desired state API for the new instance of microservice 425 managed by the packet engine 420.

Conversely, the packet engine 420 may identify or determine one or more endpoints in the current set of endpoint information that are not in the new set of endpoint information. The endpoints in the current set that are non-existent in the new set may correspond to previous instances of microservices 425 in the cluster 430 that are removed or otherwise disabled with the application of the update to the cluster 430 of microservices 425. In updating the configuration, the packet engine 420 may remove a configuration on the packet engine 420 corresponding to each endpoint removed in the new set of endpoint information. The removed configuration may specify that the packet engine 420 was to route network traffic to a corresponding instance of microservice 425 removed from the new set of endpoint information. In some embodiments, the packet engine 420 may delete the configuration from the packet engine 420 corresponding to the endpoint removed in the new set of endpoint information. In some embodiments, the packet engine 420 may disable the configuration from use on the packet engine 420. The removal of the configuration may be in accordance with the desired state API as indicated in the received request. The removed configuration may correspond to an endpoint outside the desired set of instances of microservices 425 identified in the received request.

In updating the configuration of the packet engines 420, the distributor 415 may monitor for an error from one or more of the packet engines 420. The error may correspond to a failure to update the configuration of any of the packet engines 420. The failure may be caused by any number of factors, such as a network outage in the network 104 or 104', lack of computing resources (e.g., processing or memory), or a fault in the execution of the packet engine 420, among others. Upon detecting the error in any one of the packet engines 420, the distributor 415 may restore or revert the packet engines 420 to the configurations prior to the communication of the new set of endpoint information identified from the received request. In some embodiments, the distributor 415 may identify the current set of endpoint information used by the set of packet engines 420 prior to the communication of the new set of endpoint information. With the identification, the distributor 415 may communicate the current set of endpoint information to each packet engine 420 to revert the configuration of the packet engine 420 to the configuration prior to the new set of endpoint information from the request.

The distributor 415 may determine whether the updating of the configurations across the set of packet engines 420 is successful. When no errors are detected from any of the packet engines 420, the distributor 415 may determine that the updating of the set of packet engines 420 is successful. In addition, the distributor 415 may send a response indicating success in updating the packet engines 420 to the controller 440 (or a system administrator of the cluster 430 of microservices 425). Conversely, when an error is detected from at least one of the packet engines 420, the distributor 415 may determine that the updating of the set of packet engines 420 is unsuccessful. Furthermore, the distributor 415 may send a response indicating failure (e.g., as depicted in FIG. 4B(b)) in updating the packet engines 420 to the controller 440 (or the system administrator of the cluster 430 of microservices 425).

Figure 4D:
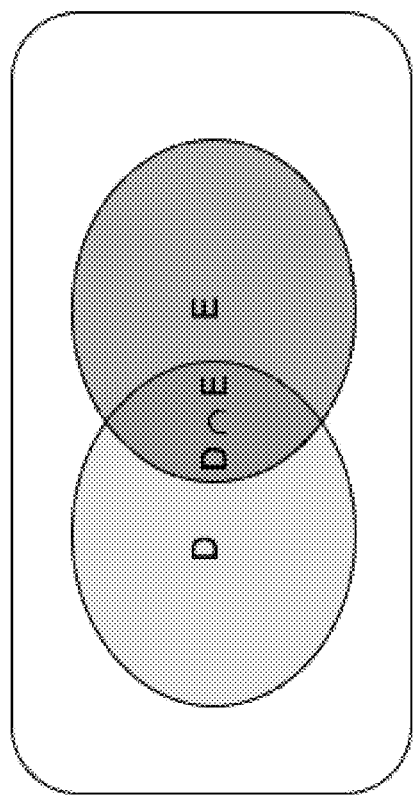
FIG. 4D is a Venn diagram of an example set of endpoints in updating configurations of a device based on changes to microservices.

Referring now to FIG. 4D, depicted is a Venn diagram depicting the set of endpoints the packet engines acts upon. Upon receiving the desired state from the distributor, the packet engine determines the different between the desired state and existing state and updates the configuration. In the Venn diagram, the green circle labeled D represents the desired states. The red circle labeled E represents the existing states. The packet engine first determines states that belong in each of the sets and then performs the following operations:

- (D−(D∩E)) Newly added Endpoint Set: This is the new endpoint set which needs to automatically bound to the service. The packet engine binds the new endpoint set to the service to update the existing state to the desired state.
- (E−(D∩E)) Removed Endpoint Set: This is the old endpoint set which needs to automatically unbound from the service. The packet engine unbinds the old endpoint to the service to update the existing state to the desired state.
- (D∩E) Common Endpoint Set: This is the existing endpoint set which will not be touched. The packet engine performs no action as the existing state is the same as the desired state.

Figure 4E:
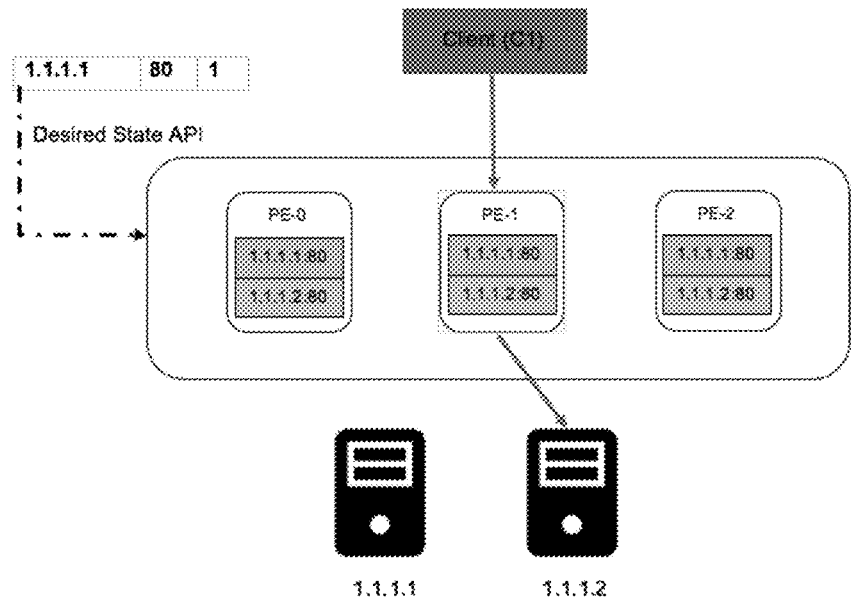
FIGS. 4E and 4F are block diagrams of an example state API of the packet engines in response to changes to microservices.
Figure 4E:
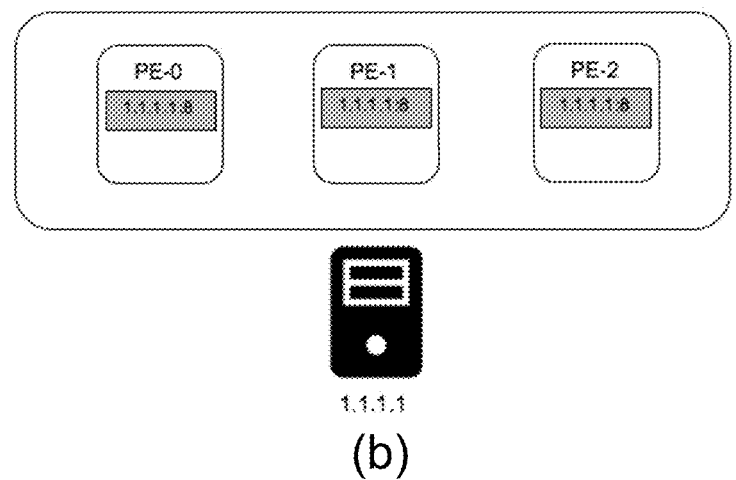

Referring now to FIG. 4E, depicted are block diagrams of an example state API of the packet engines in response to changes to microservices. In FIG. 4E(a), shown is updating the state in the ADC after receiving a request from the client. A client (C1) send the desired state to the ADC. The desired state depicted has been received as D={1.1.1.1:80}. The existing state in packet engine 1 (PE-1) is existing state E {1.1.1.1:80, 1.1.1.2:80}. Since the desired state {1.1.1.1:80} does not contain endpoint {1.1.1.2:80} which is present in the existing state E {1.1.1.1:80, 1.1.1.2:80}, the ADC will move 1.1.1.2:80 to the state "transition out of service" (TROFS). This is depicted by the second line of endpoints. The ADC does not immediately remove the configuration due to the depicted existing connection with the client C1 to avoid interrupting the existing active transaction. Once the existing transaction for client C1 completes, the ADC will move the state 1.1.1.2:80 to "out of service" (OFS) and remove/unbind the configuration from the ADC as shown in FIG. 4E(b).

Figure 4F:
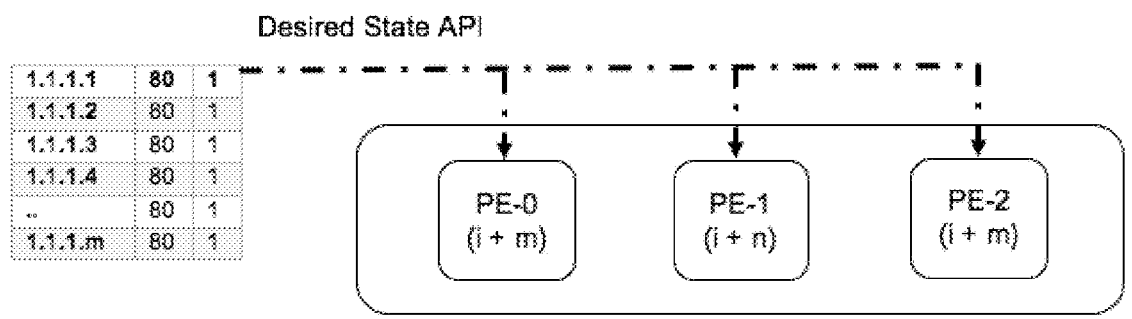
Figure 4F:
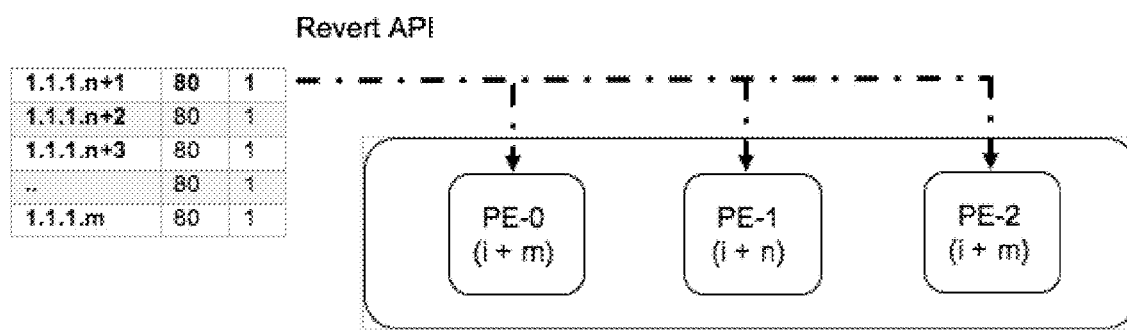

Referring now to FIG. 4F, depicted are block diagrams of an example state API of the packet engines in response to changes to microservices to ensure consistency across multiple packet engines in a single ADC. The desired state is sent to all the packet engines (PEs) by the configuration module. In normal case scenarios, all the packet engines perform the delta operation and apply the delta to achieve same state without additional synchronization. In abnormal cases, failures can happen independently on any packet engine due to issues like out of memory or other failures. The depicted mechanism allows the ADC to correct itself and synchronize the configuration across packet engines.

To ensure synchronization, each packet engine maintains an enumeration number which is incremented on successful operation. If there is an error in any packet engine, the enumeration number will be less than the other packet engines, and packet engine returns error with the set of all the failed endpoints. The distributor module will consolidate the failed endpoints from all the packet engines. The distributor module creates a super set and then sends the command to revert the API state with this super set to all the packet engines. This results in a roll back and synchronizes the configuration.

In between the configuration command and the revert command, enumeration logic ensures that packet engine will be able to gracefully handle intermittent inconsistency by blocking the core to core messaging. For example, referring to FIG. 4F(a) let's suppose a desired state API is called with m new endpoints to all the packet engines (PE-0, PE-1, PE-2). Suppose in this example all the PEs are able to do the operation except PE-1, which is only able to bind n (n<m) endpoints. So, the state will be as shown in the FIG. 4F(a) (assuming i be the initial enumeration number). The enumeration value in PE-1 will be less than the enumeration value in PE-0 and PE-2 because it was only able to bind n, rather than m endpoints. The packet engine PE-1 will return an error with the set of all the failed endpoints.

The distributor module will consolidate the failed endpoints from all the packet engines. Now the distributor module will send super set of failed endpoints (m-n) to all the packet engines, so that all the packet engines will have a consistent endpoint state with n endpoints. This will be done before the final response is sent back for the desired state API to the end user as shown in FIG. 4F(b). This revert logic with enumeration ensures that all the packet engines in ADC are synchronized and consistently configured even in stress conditions or large-scale conditions, ensuring integrity.

Figure 5:
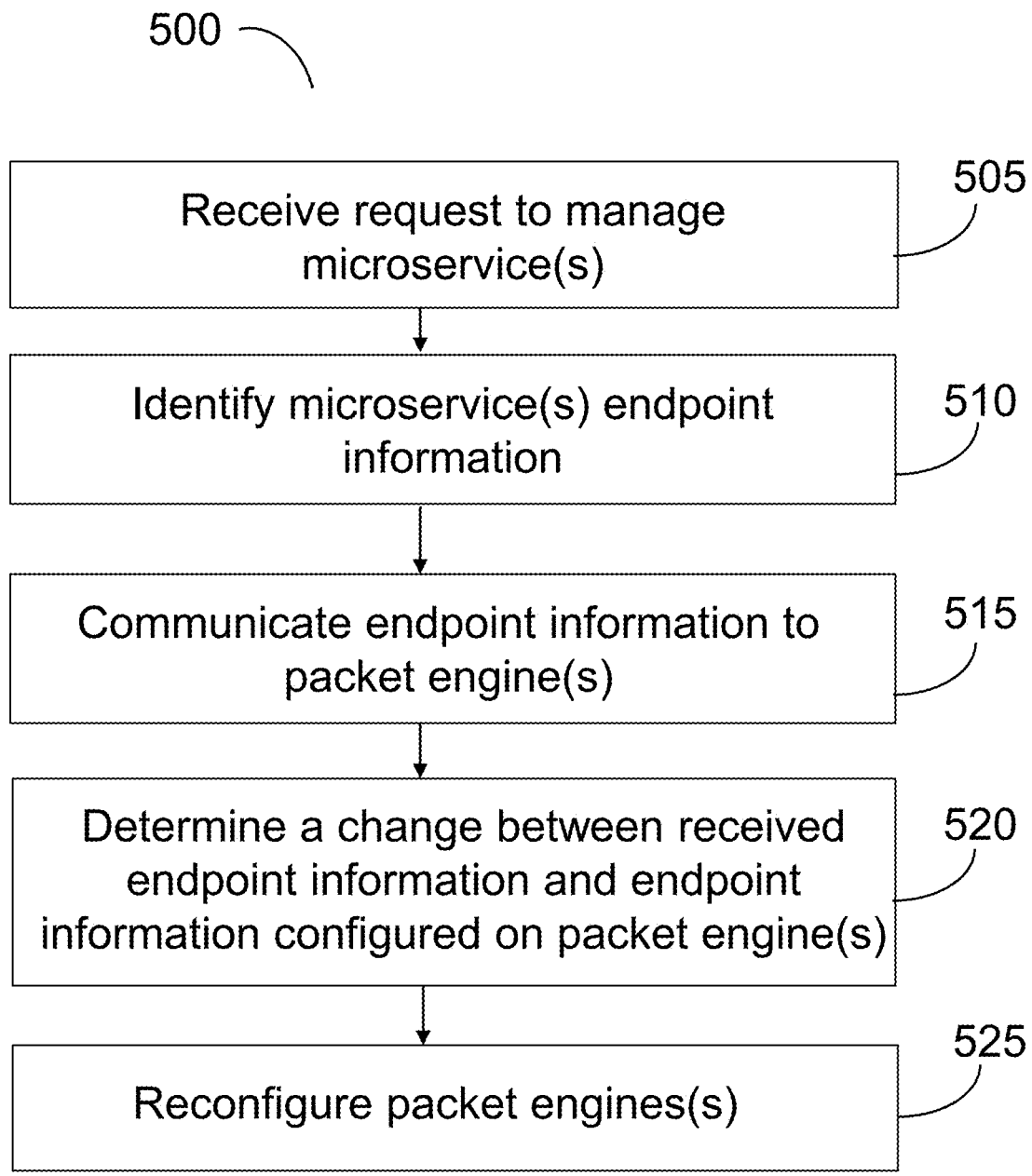
FIG. 5 is a flow diagram of a method of updating configuration of a device based on changes to microservices, in accordance with an illustrative embodiment.

FIG. 5 displays a method 500 for updating a service configuration of an application delivery controller. The method 500 may be implemented using or performed by components described in FIGS. 1-4F, such as the client 102, the appliance 200, the controller 440, the API server 435, and the cluster 430 of microservices 425, among others. In brief overview, the device receives a request to manage microservice(s) (505). The device identifies the microservice endpoint information (510). The device communicates the endpoint information to packet engines (515). A packet engine determines a difference between the received endpoint information and the endpoint information configured on the packet engine (520). The device reconfigures the packet engines (525).

At step 505, the device receives a request to manage microservice(s). The device may be a device intermediary to a plurality of clients and microservices. The device may be a device intermediary to a plurality of microservices. The device may be a device intermediary to microservices and data centers.

The device may receive a request via a desired state application programming interface (API). The desired state API may conform to the REST architectural style. The request may utilize an HTTP PUT method. The request may list the new desired state. The new desired state may correspond to new desired endpoint information. For instance, as in FIG. 4A the request may include new desired endpoint information including one or more of an IP address, a weight, or a port. For example, the request may include a field like the following: {"ip":"1.1.1.1","port":80, "weight": 1}.

The device may receive a request to update a configuration of the device to manage a desired set of instances of microservices. The device may receive the request from a controller of a cluster of microservices. The controller may be configured to receive information for the request from an API server for the microservices. The device may receive the request over a network.

At step 510, the device identifies the microservice endpoint information. The server may identify the endpoint information. The server may translate the endpoint information for the configuration engine. For instance, the server may translate the received information from JSON to dynamic length binary. The configuration engine may authenticate the request and sent the endpoint information to the distributor. The endpoint information may include a weight for each instance of the microservice.

At step 515, the device communicates the endpoint information to packet engines. The device may communicate the endpoint information to the packet engines via the distributor. The device may make copies of the endpoint information for each of the packet engines. The device may communicate copies of the endpoint information to each of the packet engines. The device may communicate a set of {IP address, port and weight} to the packet engines. The desired state API may be sent to all packet engines by the configuration engine.

At step 520, a packet engine determines a difference between the received endpoint information and the endpoint information configured on the packet engine. The packet engine receives the set of endpoint information which may include {IP address, port and weight}. The packet engine may compare the set of received endpoint information {IP address$_1$, port$_1$,weight} to the existing set of endpoint information {IP address$_2$, port$_2$,weight}. The packet engine may compare the received endpoint information to the existing information. The packet engine may classify the receive endpoint set as a newly added endpoint set if the received endpoint set does not match the existing endpoint set. The packet engine may classify the existing endpoint set as a removed endpoint set if the existing endpoint set does not match the received endpoint set. The packet engine may classify the received endpoint set and existed endpoint set as a common endpoint set if the received endpoint set matches the existing endpoint set. All packet engines may perform a delta operation to determine if the endpoint should be updated.

At step 525, the device reconfigures the packet engines. The device may bind the newly added (received) endpoint set to the packet engine upon determining that the received endpoint set does not match the existing endpoint set. The device may unbind the removed (existing) endpoint set from the packet engine upon determining that the received endpoint set does not match the existing endpoint set. The device may maintain the existing endpoint set upon determining the received endpoint set matches the existing endpoint set. All packet engines may apply the update achieve the same state as other packet engines.

The device may not unbind the endpoint if there are one or more existing connections to the endpoint. Prior to unbinding an endpoint, the device may determine if there are one or more connections to the endpoint. The device may determine if there are one or more connections to the {IP address, port} pairs. If there are one or more connections to the endpoint, the packet engine may not unbind the removed endpoint set immediately. Instead, the packet engine may put the removed endpoint in "transition out of service" (TROFS) mode. The device may monitor to endpoint to determine when there are no longer existing connections. At that point, the device may unbind the removed endpoint to the packet engine. This method avoids interrupting any existing active transactions.

To ensure consistency across multiple packet engines in the device, the device may roll back an endpoint update if it receives an error message from a packet engine. The packet engine may send an error message to the device if it detects the endpoint update has not been successful. The packet engine may determine its endpoint update has not been successful by comparing its enumeration field with the enumeration field of other packet engines.

In one example, the desired state API is sent to all packet engines by the configuration engine. All packet engines perform the delta operation of comparing existing and received endpoints to update the endpoint if the existing and received endpoints are not the same. This results in the same state across all packet engines without synchronization. In the case of a failure, however, one packet engine may be in a different state after the packet engines perform the delta operation. This may be due to a segmentation fault, a packet engine out of memory error, a system failure, or other issue.

To determine a failure, each packet engine may maintain an enumeration number. The enumeration number may be incremented on successful completion of the delta operation. The enumeration number may be compared against the enumeration number of other packet engines. If one packet engine has a lower enumeration number than the other packet engines, it may send an error message to the device. The device may contain the set of the failed endpoints. The device may consolidate the failed endpoints from the packet engines and revert the API state of all packet engines to ensure synchrony.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for updating configuration of a device based on changes to microservices, the method comprising:
   (a) receiving, by a device intermediary to a plurality of clients and microservices on one or more servers, a request via a desired state application programming interface (API) to update a configuration of the device to manage a desired set of instances of microservices;
   (b) identifying, by the device from the request, a first set of endpoint information for each instance of a microservice in the desired set of instances of microservices, the first set of endpoint information comprising an internet protocol (IP) address and port of an endpoint of a respective instance of the microservice;
   (c) communicating, by the device, the first set of endpoint information to each of one or more packet engines of the device, the one or more packet engines configured to manage network traffic over one or more networks to a current set of instances of microservices;
   (d) determining, by the one or more packet engines, a change between the first set of endpoint information and a second set of endpoint information configured on the one or more packet engine for each instance of the microservice in the current set of instance of microservices; and
   (e) updating, by the one or more packet engines based at least on the change, the configuration of the one or more packet engines to manage the network traffic over the one or more networks to the desired set of instances of microservices.

2. The method of claim 1, wherein (a) further comprising receiving, by the device, the request from a controller of a cluster of microservices.

3. The method of claim 2, wherein the controller is configured to receive information for the request from an API server for the microservices.

4. The method of claim 1, wherein one of the first set or second set of endpoint information further comprises a weight for each instance of the microservice.

5. The method of claim 1, wherein (d) further comprises determining, by the one or more packet engines, one or more endpoints in the first set of endpoints that are not in the second set of endpoints.

6. The method of claim 5, wherein (e) further comprises adding, by the one or more packet engines, configuration on the one or more packet engines for the one or more endpoints.

7. The method of claim 1, wherein (d) further comprises determining, by the one or more packet engines, one or more endpoints in the second set of endpoints that have been removed from the first set of endpoints.

8. The method of claim 7, wherein (e) further comprises removing, by the one or more packet engines, configuration on the one or more packet engines corresponding to the one or more endpoints.

9. The method of claim 1, wherein (d) further comprises determining, by the one or more packet engines, one or more endpoints that are in both the first set of endpoints and the second set of endpoints.

10. The method of claim 9, wherein (e) further comprises maintaining, by the one or more packet engines, configuration on the one or more packet engines corresponding to the one or more endpoints.

11. A system for updating configuration of a device based on changes to microservices, the system comprising:
   a device comprising one or more processors, coupled to memory and intermediary to a plurality of clients and microservices, the device configured to receive a request via a desired state application programming interface (API) to update a configuration of the device to manage a desired set of instances of microservices, and identify from the request, a first set of endpoint information for each instance of a microservice in the desired set of instances of microservices on one or more servers;
   wherein the first set of endpoint information comprises an internet protocol (IP) address and port of an endpoint of a respective instance of the microservice;
   wherein the device is configured to communicate the first set of endpoint information to one or more packet engines of the device configured to manage network traffic over one or more networks to a current set of instances of microservices;
   wherein the one or more packet engines are configured to:
      determine a change between the first set of endpoint information and a second set of endpoint information configured on the one or more packet engine for each instance of the microservice in the current set of instances of microservices; and
      update, based at least on the change, the configuration of the one or more packet engines to manage the network traffic over the one or more networks to the desired set of instances of microservices.

12. The system of claim 11, wherein the device is further configured to receive the request from a controller of a cluster of microservices.

13. The system of claim 11, wherein the controller is configured to receive information for the request from an API server for the microservices.

14. The system of claim 11, wherein one of the first set or second set of endpoint information further comprises a weight for each instance of the microservice.

15. The system of claim 11, wherein the one or more packet engines are further configured to determine one or more endpoints in the first set of endpoints are not in the second set of endpoints.

16. The system of claim 15, wherein the one or more packet engines are further configured to add configuration on the one or more packet engines for the one or more endpoints.

17. The system of claim 11, wherein the one or more packet engines are further configured to determine one or more endpoints in the second set of endpoints that have been removed from the first set of endpoints.

18. The system of claim 17, wherein the one or more packet engines are further configured to remove configuration on the one or more packet engines corresponding to the one or more endpoints.

19. The system of claim 11, wherein the one or more packet engines are further configured to determine one or more endpoints that are in both the first set of endpoints and the second set of endpoints.

20. The system of claim 19, wherein the one or more packet engines are further configured to maintain configuration on the one or more packet engines corresponding to the one or more endpoints.

* * * * *